United States Patent [19]
Ishimaru et al.

[11] Patent Number: 5,601,176
[45] Date of Patent: Feb. 11, 1997

[54] ARMATURE ASSEMBLY IN AN ELECTROMAGNETIC COUPLING DEVICE

[75] Inventors: Takashi Ishimaru; Toshio Takahashi, both of Kiryu, Japan

[73] Assignee: Ogura Clutch Co., Ltd., Japan

[21] Appl. No.: 421,480

[22] Filed: Apr. 13, 1995

[30] Foreign Application Priority Data

Apr. 15, 1994 [JP] Japan .................................. 6-101496
Nov. 10, 1994 [JP] Japan .................................. 6-301563

[51] Int. Cl.⁶ .......................... F16D 27/112; F16D 65/21
[52] U.S. Cl. .................... 192/200; 192/30 V; 192/84.96
[58] Field of Search ................................ 192/84 C, 200, 192/30 V

[56] References Cited

U.S. PATENT DOCUMENTS

| | | |
|---|---|---|
| 5,036,964 | 8/1991 | Booth et al. |
| 5,150,779 | 9/1992 | Booth . |
| 5,184,705 | 2/1993 | Sekiguchi . |
| 5,320,206 | 6/1994 | Maejima ............... 192/84 C |
| 5,392,889 | 2/1995 | Koitabashi ............ 192/84 C |

FOREIGN PATENT DOCUMENTS

| | | |
|---|---|---|
| 4228931 | 8/1992 | Japan . |
| 4262127 | 9/1992 | Japan . |
| 5272556 | 10/1993 | Japan . |

*Primary Examiner*—Vinh T. Luong
*Assistant Examiner*—Saul Rodriguez
*Attorney, Agent, or Firm*—Reising, Ethington, Barnard & Perry

[57] ABSTRACT

The armature assembly (9 or 17) includes a hub (10 or 19) adapted to be connected to and rotate with an input shaft (8 or 18). The hub (10 or 19) includes a flange (10a or 19a) connected to a composite material armature support plate (12 or 21). Rubber dampers (15 or 23) are molded to rivets (14 or 24) and are pressed into cylindrical peripheral walls (12a or 21b) of damper holder sections (13 or 22). The rivets (14 or 24) are staked to an armature (16 or 25). The rubber dampers (15 or 23) bias the armature (16 or 25) into contact with surface of a stopper (10e or 21g) when an electromagnetic clutch (1) is not energized and a space (G or $G_2$) is formed that extends axially from the armature (16 or 25) to the armature support plate (12 or 21) and radially outward from the stopper (10e or 21g).

13 Claims, 9 Drawing Sheets

ARMATURE ASSEMBLY IN AN ELECTROMAGNETIC COUPLING DEVICE

The application is based on Japanese Application No. Hei 6[1994]-101496, filed Apr. 15, 1994 and Japanese Application No. Hei 6[1994]-301563, filed Nov. 10, 1994.

TECHNICAL FIELD

This invention is in an electromagnetic coupling device and more specifically in an armature assembly with rubber dampers in an electromagnetic clutch.

BACKGROUND OF THE INVENTION

Electromagnetic coupling devices are used for clutches for driving compressors of automobile air conditioning systems. Japanese Kokai Patent Application No. Hei 4[1992]-262127 discloses an electromagnetic clutch which is suitable for driving an air conditioning compressor. The armature assembly includes an armature support member made of reinforced composite material. A metal armature hub, with splines for engaging a spline compressor input shaft, is molded in the composite armature support member or attached to the armature support member by mechanical fasteners. The armature support member has integral stiffener ribs, three rubber damper holders and an armature stop surface. Rubber dampers with integral metal pins are mounted in the rubber damper holders. An armature is attached to the integral metal pins in the rubber dampers. The rubber dampers bias the armature toward the armature stop surface and allow the armature to move away from the armature stop surface and into contact with a clutch rotor when the electromagnetic coil is energized and the clutch is engaged.

Each time the electromagnetic coil of an electromagnetic clutch is energized to engage the clutch, a bending load is placed on the armature support member. Over a period of time and a substantial number of clutch engagements, the damper holders of the armature support member and the armature stop surface adjacent to the damper holders becomes deformed toward the rotor. The deformation occurs with metal armature support members as well as with reinforced composite armature support members. The deformation of the armature support member decreases the air gap between the armature and the rotor when the power to the electromagnetic coil is discontinued. If the air gap is decreased too much, the armature may contact the rotor when the clutch is disengaged. The contact between the armature and the rotor will tend to transmit torque and drive the compressor. Because the armature is not clamped to the rotor by electromagnetic force, there will be slippage and heat will be generated. Heat can destroy and electromagnetic coupling device. The rubber dampers are particularly susceptible to damage by heat.

SUMMARY OF THE INVENTION

An object of the invention is to provide a reliable armature assembly for an electromagnetic coupling device. Another object of the invention is to provide an armature support member with increased strength. A further object of the invention is to provide an armature assembly that can accommodate substantial armature support member distortion without adverse affect on the operation of the electromagnetic coupling device. A still further object of the invention is to provide an armature assembly with reduced size for a given torque transmission capacity. Another still further object of the invention is to provide an armature assembly with a space between the armature and the armature support member at the outside in the radial direction when the armature is in contact with an armature stop surface on the armature support member.

The armature, of an electromagnetic clutch equipped with the armature assembly of this invention, is magnetically biased toward the rotor against the elasticity of the rubber dampers by the electromagnetic pull of the magnetic flux in the electromagnetic coil. The armature is pulled toward the armature support member and into contact with a stop surface on the armature support member by the elasticity of the rubber dampers and separated from the rotor when power to the electromagnetic coil is terminated and the magnetic flux dies out. A circular space is formed between the armature and the armature support member and extends radially outward from the stop surface on the support member and is opened to the outside. The armature support member and the armature do not make contact with each other radially outward from the stop surface. The circular space has an axial dimension that exceeds the angular deformation of the armature support member resulting from operation of the electromagnetic clutch. The circular space thereby allows the armature to contact the stop surface and maintains the air gap between the armature and the rotor when the electromagnetic coupling device is in the unexcited state.

The foregoing and other objects, features and advantages of the present invention will become apparent in the light of the following detailed description of exemplary embodiments thereof, as illustrated in the accompanying drawing.

DESCRIPTION OF THE PREFERRED EMBODIMENT

Figure 1:
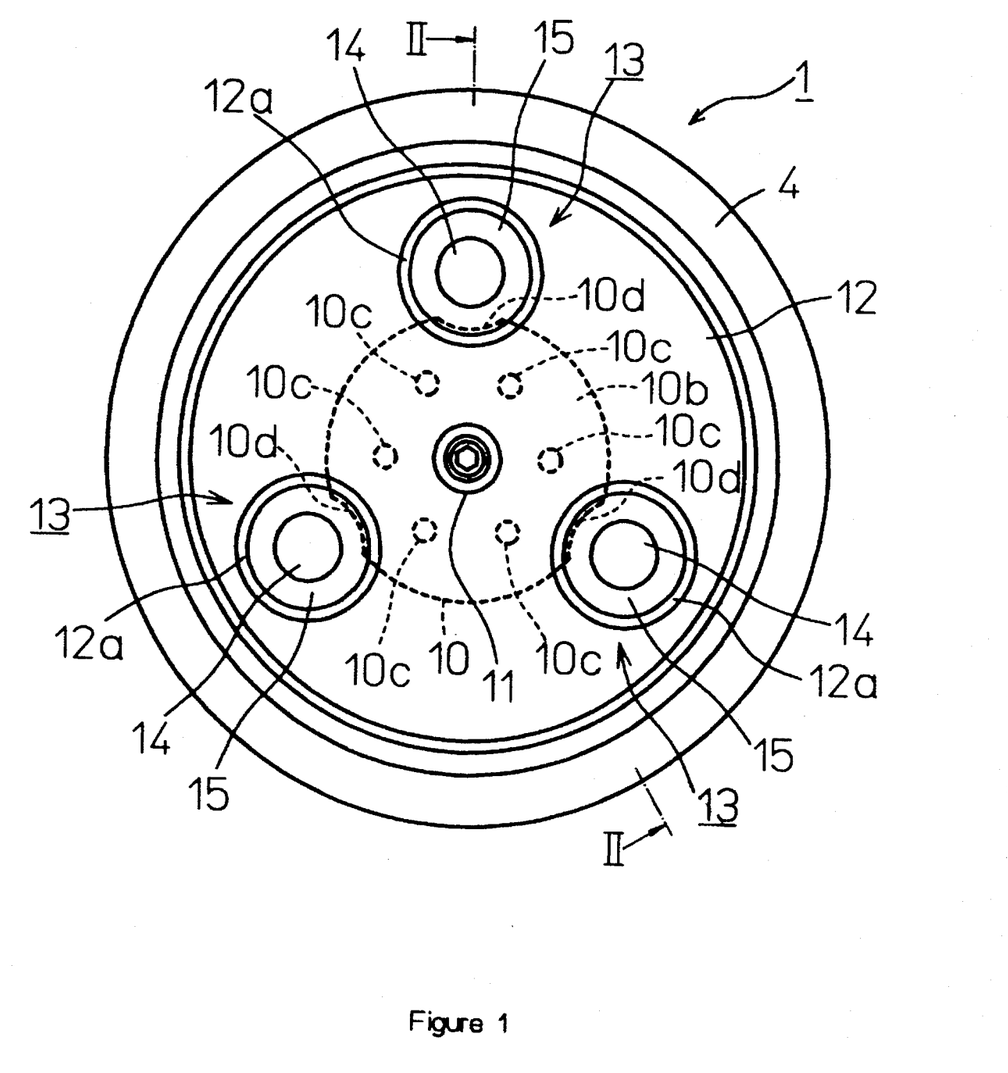
FIG. 1 is a front elevational view of the electromagnetic coupling device.
Figure 2:
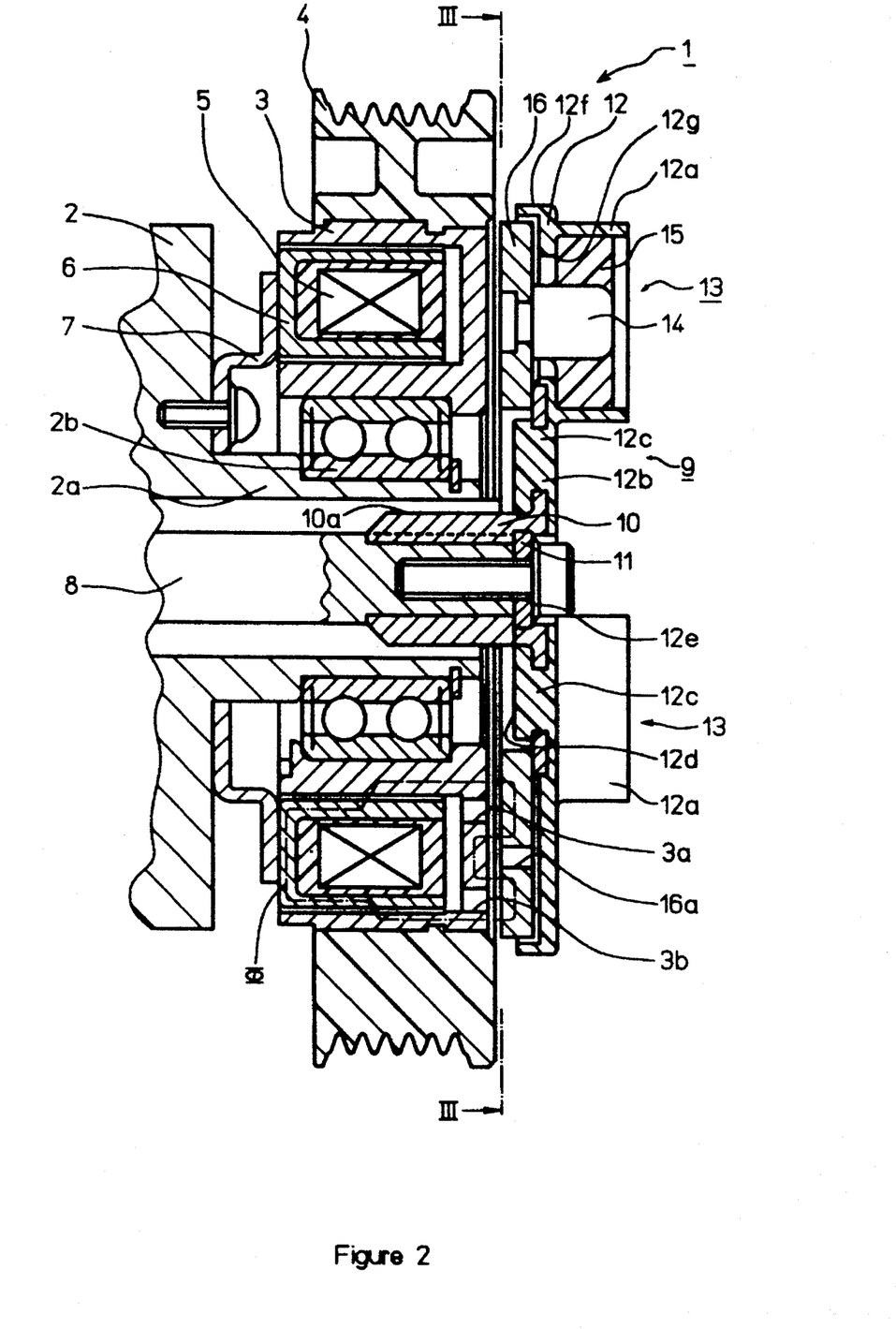
FIG. 2 is a sectional view taken along line II—II in FIG. 1.

The electromagnetic clutch generally designated 1 as shown in FIGS. 1 and 2 is mounted on the input shaft 8 of an automobile air conditioner compressor 2, a portion of which is shown in FIG. 2. The rotor 3 of the electromagnetic clutch 1 is driven by a belt (not shown) that is driven by an automobile engine. The rotor 3 is driven any time the automobile engine is running. The electromagnetic clutch 1 is engaged and transmits torque to drive the compressor 2 only when the electromagnetic field core 6 is energized and the clutch is engaged. The rotor 3 is supported on the cylindrical section 2a of the compressor 2 by a bearing 2b. The rotor 3 is free to rotate relative to the compressor 2. A poly V groove pulley 4, made of a plastic material, is integrally attached to the outer peripheral face of the rotor 3. Slits 3a and 3b for routing the flux are punched in the rotor 3 by a press. The slits 3a and 3b are both arcuate slots separated from other arcuate slots with the same radius by bridges. After the arcuate slots are punched in the rotor 3, the rotor is placed in an injection mold and a plastic material is injected into the mold to form the poly V groove pulley 4. A field core 6 which contains an electromagnetic coil 5 is attached to the housing of the compressor 2 by an installation plate 7 that supports the field core in a circular groove in the rotor 3.

An armature assembly 9 is attached to the input shaft 8 of the compressor 2 for rotation with the input shaft. The armature assembly 9 has an armature hub 10. The armature hub 10 has a boss 10a with a splined bore that receives and mates with splines on the input shaft 8 to prevent rotation of the hub relative to the input shaft. A plate 11 is placed in one end of the bore through the hub 10 and fastened in place by staking or other appropriate fastening systems. The separate plate 11 allows the entry of a broach into the bore to form the splines. Other manufacturing procedures allow splines to be formed in the hub 10 when the hub includes an integral plate 11. One of the manufacturing procedures includes inserting a spline forming tool in the hub 10 until it contacts the integral plate 11, pressing the outer surface of the boss 10a of the hub 10 to reduce the diameter of the boss and form internal splines with the external surface of the spline forming tool and then remove the spline forming tool. A disk-shaped flange 10b extends radially outward from the edge surface of the boss 10a of the armature hub 10. Multiple engagement holes 10c are bored in the disk-shaped flange 10b at equally spaced positions over the same circumference as shown in FIG. 1. A total of six holes 10c are shown. The number of holes 10c could however be increased or decreased. Semi-circular cutouts 10d are formed in the radially outer surface of the flange 10b to provide space for rubber damper holding sections 13.

Figure 3:
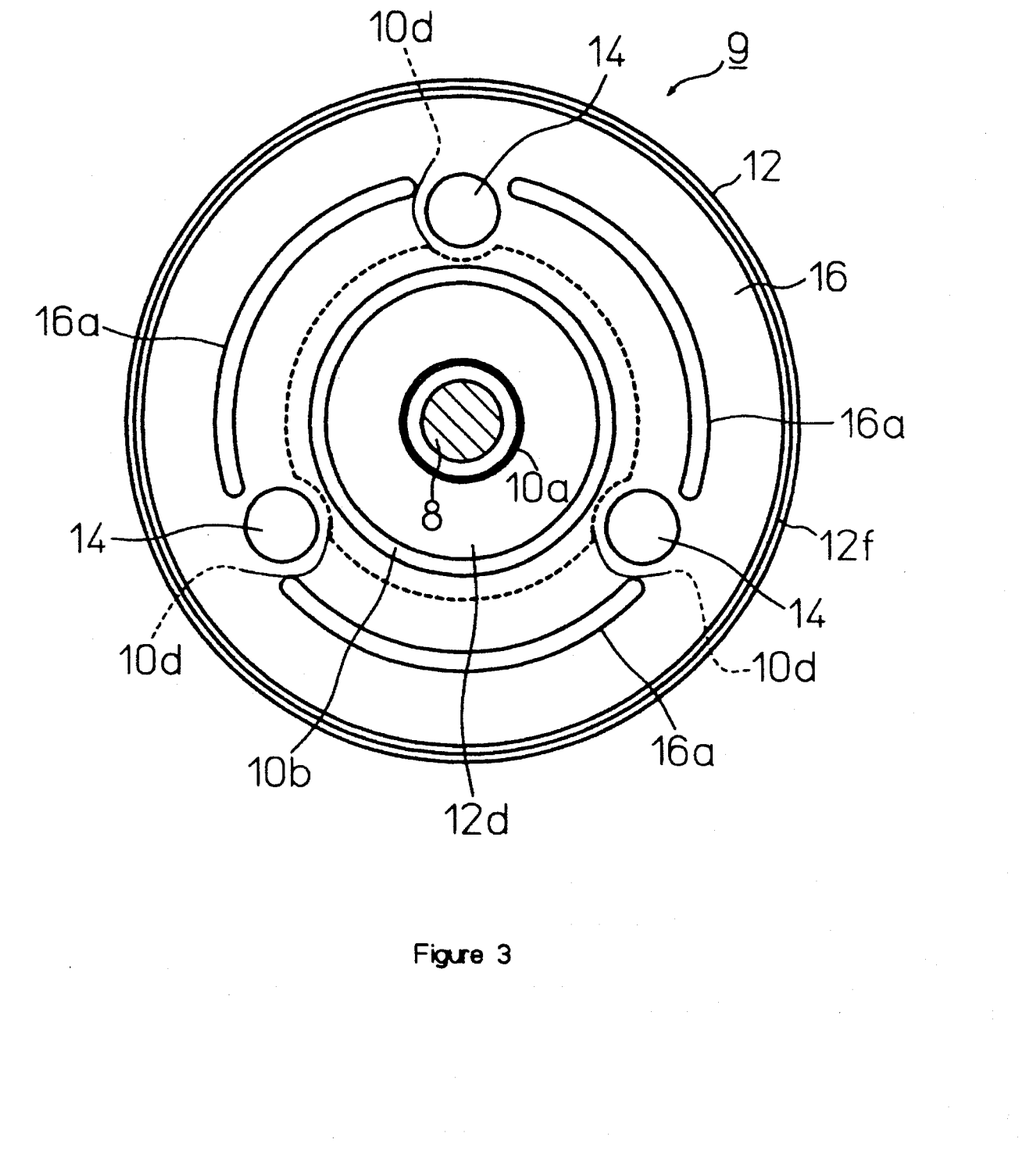
FIG. 3 is a sectional view taken along line III—III in FIG. 2.

An armature support plate 12 is formed from a reinforced plastic or composite material with the flange 10b of the hub 10 partially embedded within the armature support plate. Multiple rubber damper holder sections 13 with recesses surrounded by cylindrical peripheral walls 12a at equally spaced positions are integral with the radially outer portions of the armature support plate 12. Rotation locking parts 12c of the armature support plate 12 extend through the engagement holes 10c in the armature hub 10 and prevent angular movement of the armature support plate 12 relative to the armature hub 10 about the axis of rotation of the input shaft 8. The circular plate 12b is integral with the rotation locking parts 12c and encases one side of the flange 10b of the hub 10. A slip preventing portion 12d of the composite armature support plate 12 is integral with the rotation locking parts 12c, extends radially outward from the boss 10a and encases most of the other side of the flange 10b. Radially outer portions of the side surface 10e of the flange 10b are not encased by the slip preventing portion 12b as shown in FIG. 3. A cylindrical area 12e of the armature support plate 12, contacts the plate 11. If the plate 11 is not an integral part of the hub 10 or is not staked in the boss 10a, the cylindrical area 12e can function to prevent slippage of the attachment plate 11 relative to the hub 10.

Rivets 14 form posts which are molded into the center of the rubber dampers 15. The rubber dampers 15 are press fit in the rubber damper holder sections 13 with a portion of each rivet 14 extending through a through-hole 12g in the armature support plate 12. Each through-hole 12g is in the center of a rubber damper holder section 13. The rubber dampers 15 fit tightly within the cylindrical peripheral walls 12a of the rubber damper holder sections 13. The ends of the rivets 14 which project through the through-holes 12g also pass through bores through the armature 16 and are staked to the armature. Slits 16a are formed in the armature to route the magnetic flux. The slits 16a are separated from each other by metal end sections or bridges.

Figure 4:
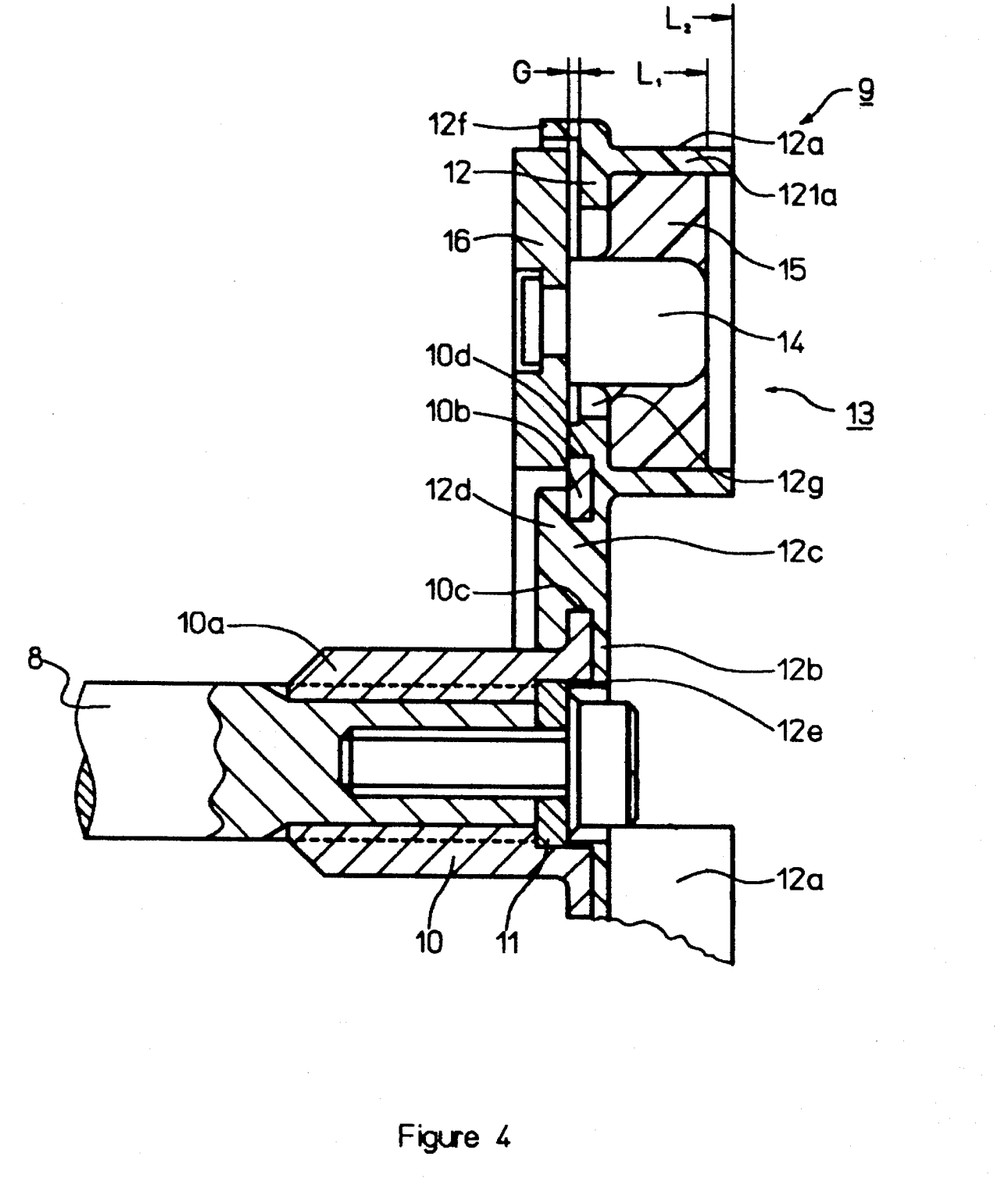
FIG. 4 is an enlarged sectional view of a portion of the armature assembly as shown in FIG. 2.

The inner diameter of the armature 16 is less than the outermost diameter of the flange 10b of the armature hub 10. The radially inner portion of the armature 16 makes contact with the side surface 10e area that is not covered by the slip preventing portion 12d of the armature support plate 12. The rubber dampers 15 elastically bias the armature 16 toward contact with the portion of the side surface 10e of the flange 10b that functions as a stopper. The side surface 10e of the flange 10b that makes contact with the armature 16 is higher than radially outer surfaces of the armature support plate 12 that are in axial alignment with the armature. This relationship between the side surface 10e and the surface of the armature support plate 12 adjacent to the armature 16 forms a circular space G shown in FIG. 4. The circular space G extends axially from the armature 16 to the armature support plate 12 and radially outward from the flange 10b. The semi-circular cutouts 10d in the flange 10b, shown in FIG. 3, are filled with reinforced composite material of the armature support plate 12 adjacent to the rubber damper holder sections 13. The circular space G is open to the outside in the radial direction. The cylindrical cover 12f on the armature support plate 12 is radially spaced from the armature 16 and does not close the circular space G.

During operation of the electromagnetic clutch 1, current supplied to the electromagnetic coil 5 generates a magnetic flux Φ. The magnetic flux Φ flows through a flux path in a double flux shape which is routed to the armature 16 by the slits 3a, 3b and 16a from the rotor 3 by way of the air gap and returned to the rotor. The armature 16 is magnetically attracted by the rotor 3 against the elasticity of the rubber dampers 15 and moves into contact with the rotor. The magnetic flux Φ holds the armature 16 in contact with the rotor 3 with substantial force and torque transmitted from the engine to the rotor is transmitted to the air conditioning compressor 2. The flux Φ is shut off by stopping current flow through the electromagnetic coil 5. When the magnetic flux Φ is shut off, the armature 16 is pulled toward the armature support plate 12 by the elasticity of the rubber dampers 15 and separates from the rotor 3. The armature 16 is moved by the rubber dampers 15 into contact with the side surface 10e, on the flange 10b of the armature hub 10, which serves as a stopper.

Figure 5:
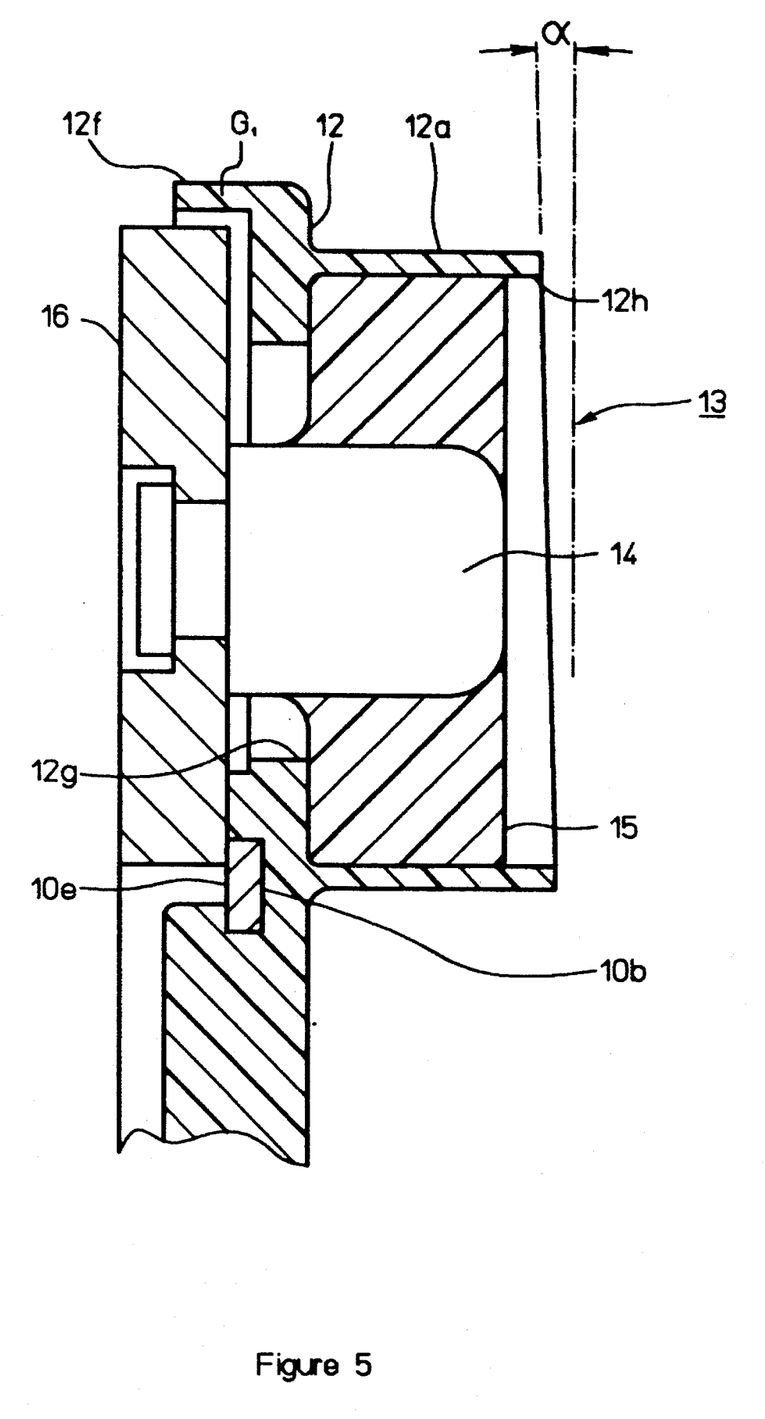
FIG. 5 is an enlarged fragmentary sectional view of the upper portion of the armature assembly as shown in FIG. 4.

An armature support plate 12 is pulled toward the rotor 3 by the elasticity of the rubber dampers 15 anytime the electromagnetic coil 5 is energized and the armature 16 is pulled into contact with the rotor 3. This force on the armature support plate 12 will, due to repeated operation over time, result in some deformation of the outer peripheral edge of the armature support plate as shown in FIG. 5. The deformation occurs in armature support plates made from plastics as well as in metal armature support plates. The side surface 10e of the flange 10b which makes contact with the armature 16 is formed slightly higher or axially displaced from the surface of the armature support plate 12 to form a toroidal space G as explained above and as shown in FIG. 4. When the outer peripheral edge of the armature support plate is deformed by an angle α as shown in FIG. 5, a space $G_1$ is formed. The space $G_1$ is smaller than the original space G. If the axial thickness of the original space G exceeds the deformation of the armature support plate 12 adjacent to the outer peripheral edge of the armature 16, the deformation will not restrict movement of the armature away from the rotor 3. The armature 16 is moved into contact with the side surface 10e of the flange 10b by the rubber dampers 15 because movement of the armature is not restricted by deformation of the outer peripheral portion of the armature support plate 12. The side surface 10e of the flange 10b is close to the center of the armature assembly 9 and does not deflect or deform a significant amount. The air gap between the armature 16 and the rotor 3 remains substantially constant through repeated operation over time and the armature 16 fully disengages from the rotor when the electromagnetic clutch 1 is disengaged. By maintaining the air gap between the armature 16 and the rotor 3, when current to the electromagnetic coil 5 is shut off, contact between the rotor and the armature, unintended rotation of the armature assembly 9 and heat generated due to slippage between the armature and the rotor are eliminated.

Figure 6:
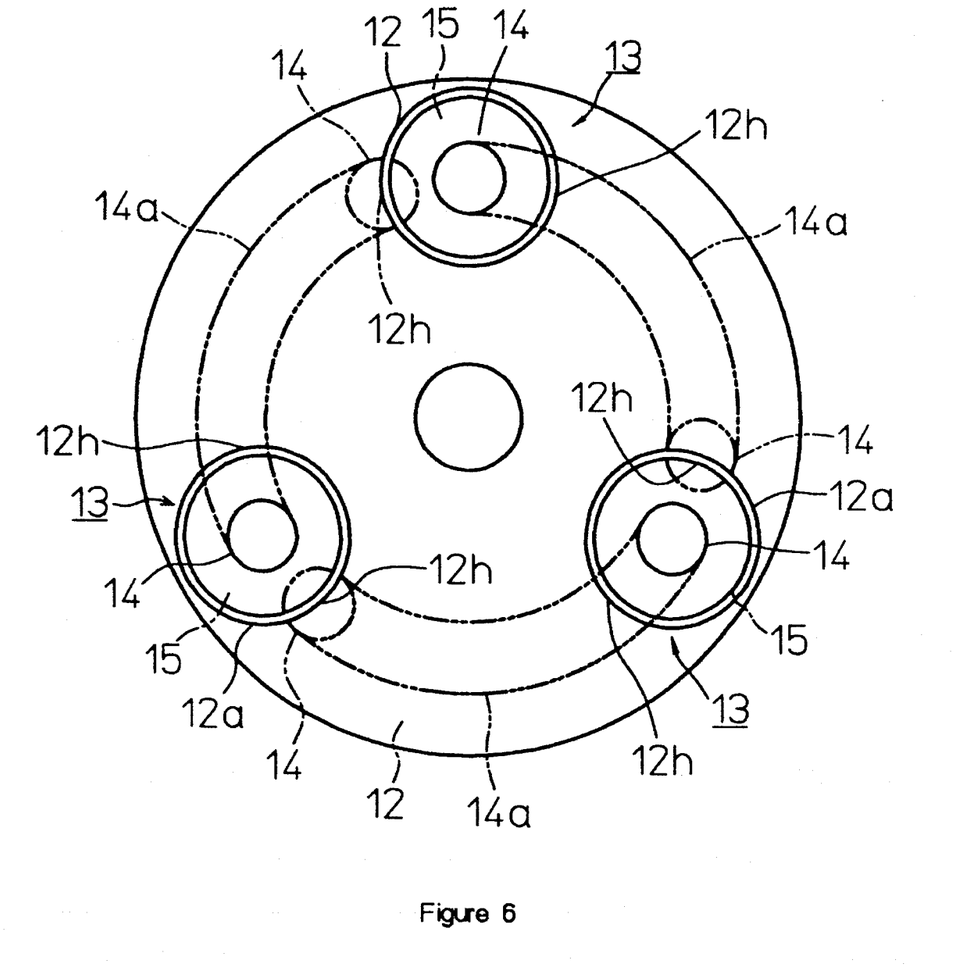
FIG. 6 is a front elevational view of the armature assembly with failed rubber dampers.

Electromagnetic clutches 1 occasionally fail. Failures generally include the generation of heat. The heat can either cause the failure or result from the failure. The heat will destroy the rubber dampers 15. If the input shaft 8 is locked or requires high torque to rotate, the rivets 14 may rub against the armature support plate 12, generate additional heat due to friction and melt the plate 12 as indicated by the long radius and short radius arcs 14a shown in FIG. 6. The armature support plate 12 could be melted into two separate parts. To prevent the armature support plate 12 from being separated into two parts, the cylindrical peripheral walls 12a are provided with projections 12h shown in FIG. 4. The projections 12h extend past the free ends of the rivets 14. The projections 12h of the cylindrical peripheral walls 12a are not in contact with the rivets 14 and are not therefore melted by rubbing contact with the rivets 14. The projections 12h thus prevent separation of the armature support plate 12 into two separate pieces.

Figure 7:
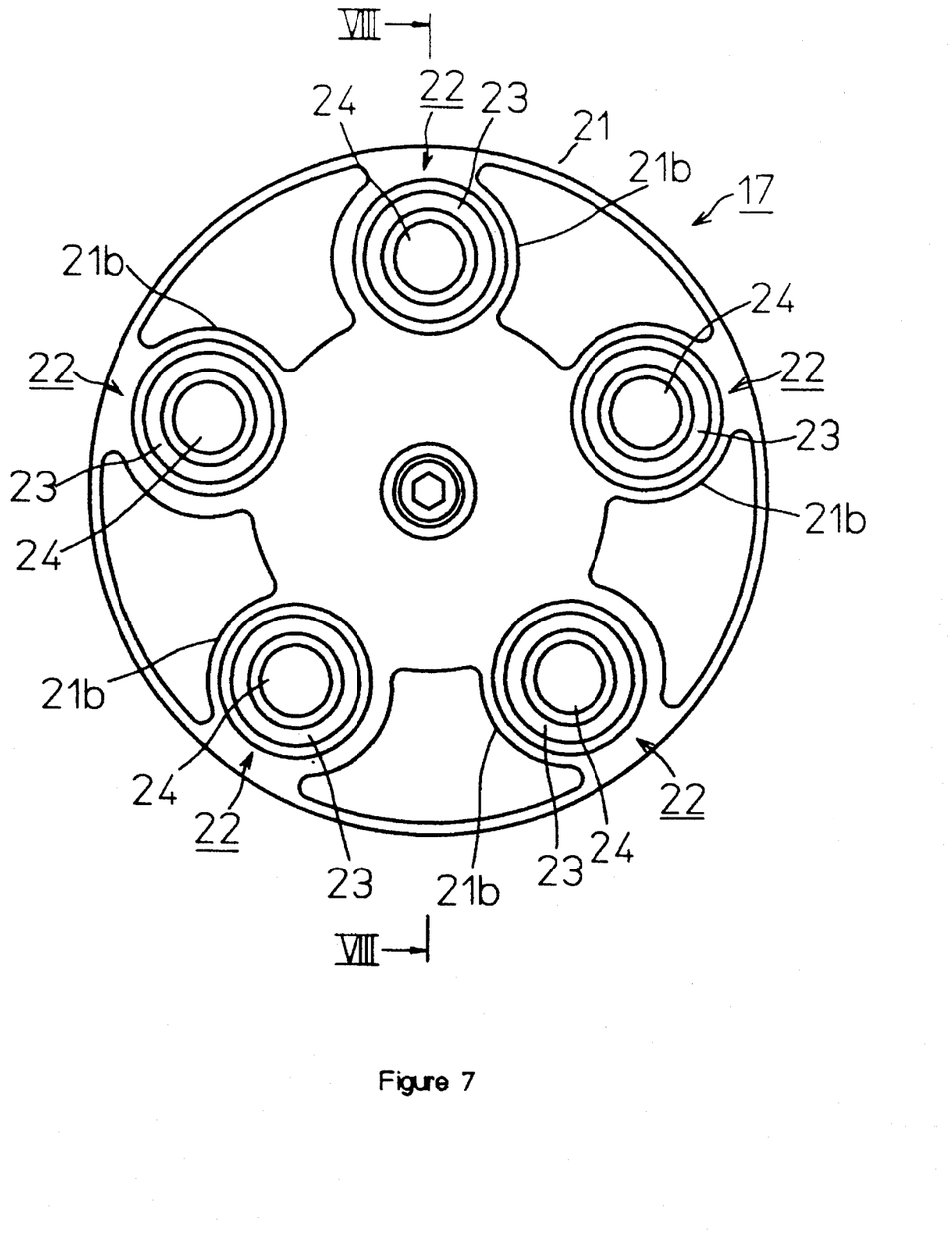
FIG. 7 is a front elevational view of a modified armature assembly that embodies the invention.
Figure 8:
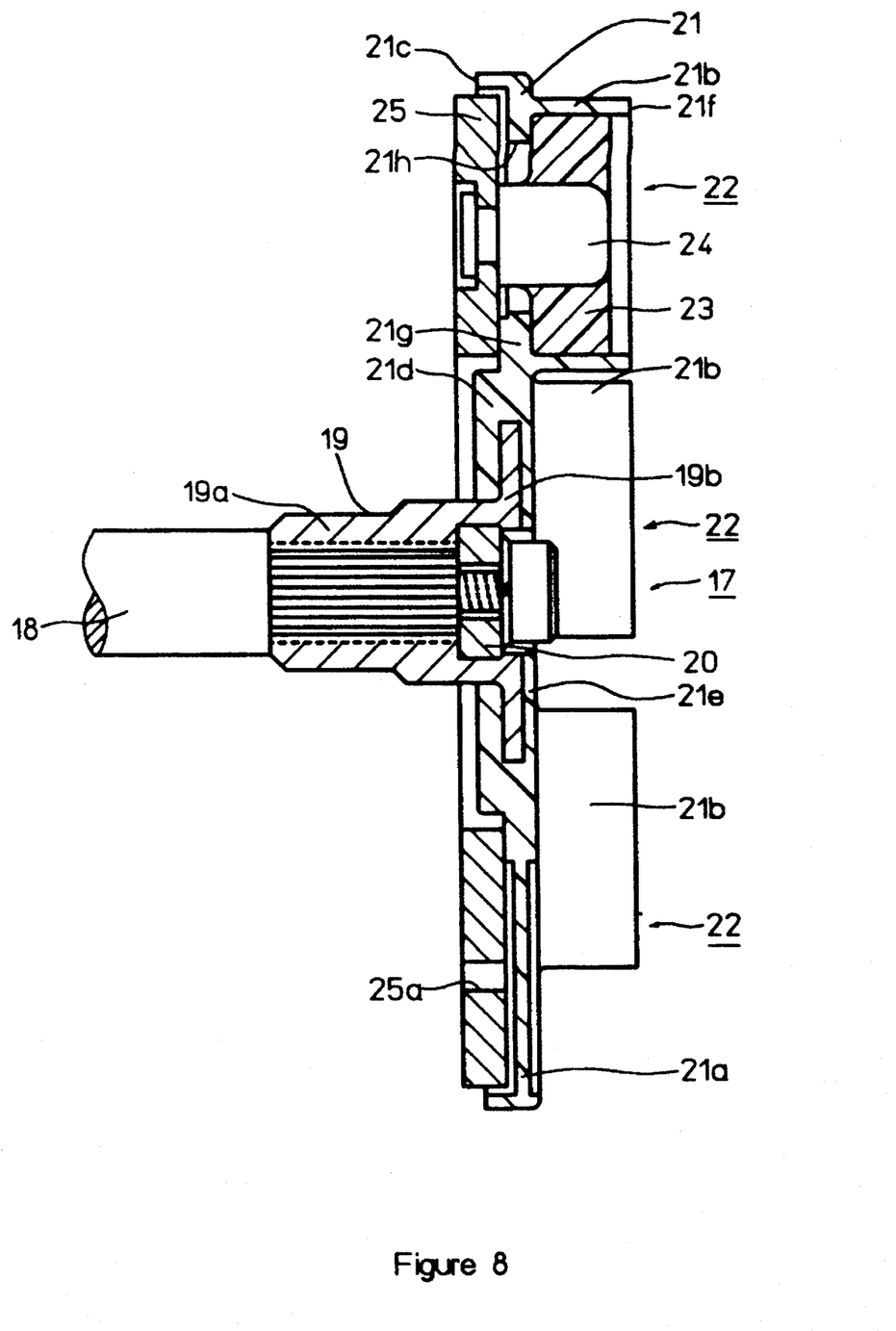
FIG. 8 is a sectional view taken along line VIII—VIII of FIG. 7.
Figure 9:
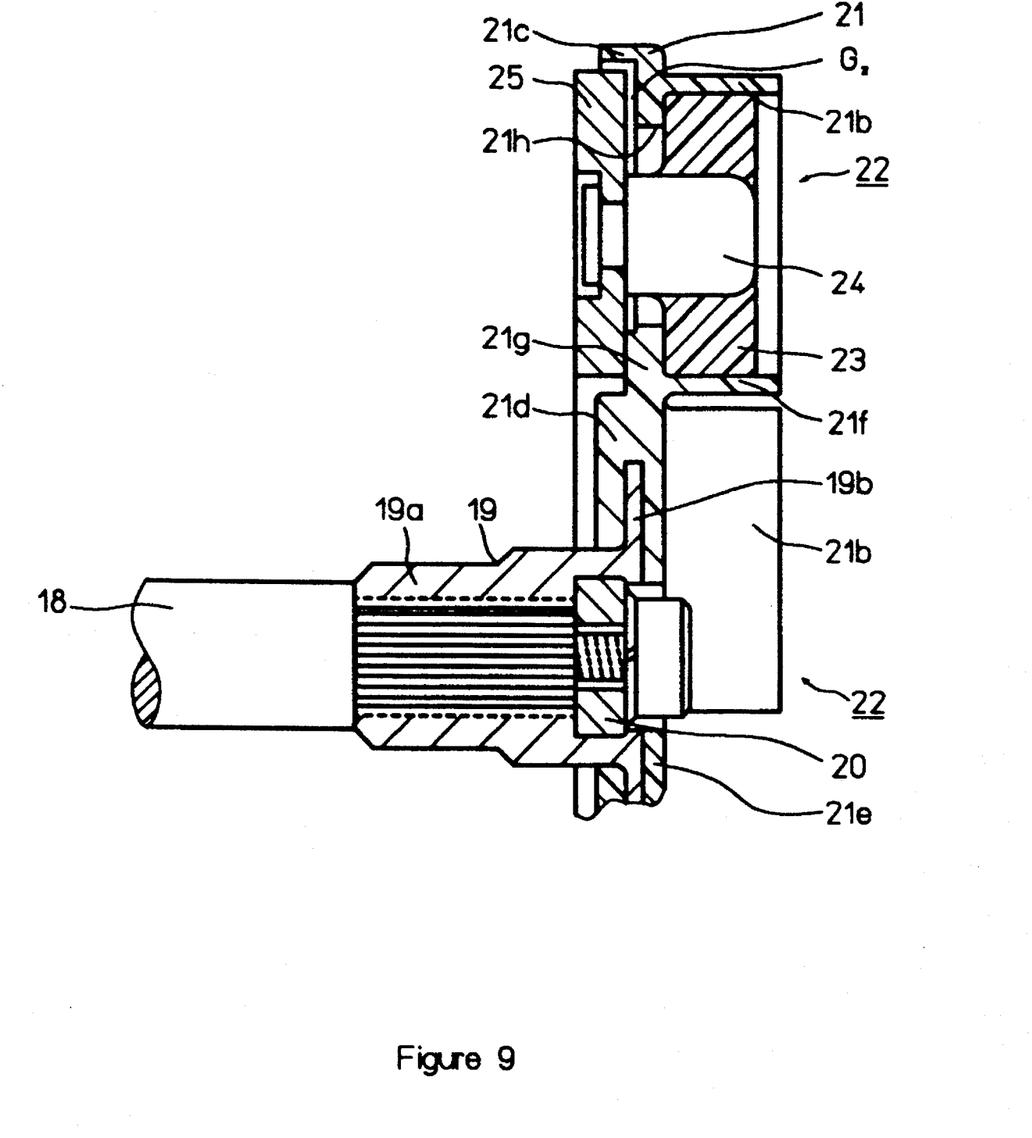
FIG. 9 is an enlarged sectional view of the upper portion of the armature shown in FIG. 8.

The armature assembly 9 described above and shown in FIGS. 1 through 6 has three rubber damper holder sections 13 holding rubber dampers 15. FIGS. 7 through 9 discloses an armature assembly 17 with five damper holder section 22, five rubber dampers 23 and five rivets 24. Each rubber damper 15 or 23 is capable of transmitting a predetermined force for a period of time. Increasing the number of rubber dampers 23 makes it possible to increase the total torque transmitted, to decrease the distance from the axis of rotation of the input shaft 18 to the rivets 24 or decrease the size of the rubber dampers 23. In many automotive vehicle applications, the space available for an air conditioning compressor is limited. The five rubber dampers 23 make it possible to reduce the axial thickness of the rubber dampers and to reduce the distance from the center of the rubber dampers to the axis of rotation of the input shaft 18 while supplying the same torque to the input shaft that is transmitted by the armature assembly 9 with three rubber dampers 15. The armature assembly 17 can be substantially smaller in diameter and in axial thickness than the armature assembly 9 and still transmit the same torque. Armature assemblies can obviously be designed with more than five rubber dampers or with less than five rubber dampers.

The armature assembly 17 has five rubber damper holding sections 22 shown in FIGS. 7, 8 and 9. The rubber damper holding sections 22 each have cylindrical peripheral walls 21b formed from a composite material together with the armature support plate 21. The rubber damper holding sections 22 are equally spaced from each other at the same distance from the axis of rotation of the input shaft 18 on the radially outer portion of the armature support plate 21 and flange 21a. The cylindrical peripheral walls 21b extend axially from a base with an aperture 21h. Rivets 24 are molded into the rubber dampers 23. The rubber dampers 23 are pressed into the cylindrical peripheral walls 21b with an end of each of the rivets 24 received in apertures through an armature 25. The rivets 24 are staked to retain the armature 25. A projection 21f of the cylindrical peripheral walls 21b extends axially past the surface of the rubber dampers 23 as shown in FIGS. 8 and 9. The cylindrical cover 21c is integrally formed at the outer peripheral edge of the armature plate 21 and extends in the axial direction of the input shaft 18.

An armature hub 19 has a boss 19a and a circular flange 19b. The boss 19a has a central bore with internal splines and a plate 20. The plate 20 can be a separate member that is staked in the boss 29a or it can be formed integral with the boss as explained above. The splines on the end of the input shaft 18 mate with the splines in the boss 19a and a threaded fastener clamps the plate 20 to the end of the shaft 18.

A circular flange 19b of the armature hub 19 extends radially outward from the edge face of the boss 19a. The armature hub 19 is mounted in a mold and the composite material that forms the armature support plate 21 is injected into the mold. The circular flange 19b is completely encased in the reinforced plastic during the injection molding process. A composite material boss 21d covers one side of the circular flange 19b and the other side of the circular flange is covered by a portion of the armature support plate 21 that ends with an integral cylindrical area 21e that extends into contact with the attachment plate 20. The radially outer edge of the circular flange 19b can be provided with some recesses to prevent movement of the armature support plate 21 relative to the armature hub 19 if required. A stopper portion 21g of the armature support plate 21 extends radially outward from the boss 21d. The stopper portion 21g has an armature contact surface spaced radially outward from the circular flange 19b and in a plane that is perpendicular to the axis of rotation of the input shaft 18. The rubber damper 23 and the rivets 24 attach the armature 25 to the armature support plate 21 as explained above. The inner diameter of the armature 25 is greater than the outer diameter of the boss 21d and the outer diameter of the circular flange 19b. The rubber dampers 23 bias the armature 25 toward the armature support plate 21. When the armature 25 is not pulled toward the rotor by an electromagnetic force, a radially inner part of the armature contacts the armature contact surface on the stopper portion 21g of the armature support plate 21. The boss 21d is received within the center of the armature 25 when the armature is in contact with the stopper portion 21g and a circular space $G_2$ is formed which extends axially from the armature to the armature support plate 21 and radially outward from the radially outer edge of the stopper portion 21g past the radially outer edge of the armature. The radially outer edge of the stopper portion 21g is positioned between the radially inner edge of the armature 25 and the rivets 24 and preferably between the radially inner edge of the armature and the radially inner edge of the aperture 21h in the armature support plate 21 that the rivets pass through.

The modified armature assembly 17 is interchangeable with the armature assembly 9 and functions the same way. The armature assembly 17 has slits 17a shown in FIG. 8 for routing the magnetic flux. These slits 17a correspond to the slits 16a and the armature assembly 9 and are separated by bridges. The five bridges of the armature 25 will change the characteristics of the armature assembly 17 slightly from the armature assembly 9 with three bridges separating the slits 16a. The contact between the armature 25 and the stopper portion 21g, which is a composite material, will make less noise than the contact between the armature 16 and the metal side surface 10e of the armature hub 10. Both armature assemblies 9 and 17 substantially reduce the quantity of material that must be saturated before the electromagnetic clutch is engaged. Both armature assemblies also substantially prevent changes in the air gap between the armature 16 or 25 and the rotor 3 over time due to deformation of the armature support plate 12 or 21 over time.

The circular spaces G and $G_2$ described above is created by removing material from the radially outer portion of the armature support member 12 or 21. This is the generally preferred method for creating the space G or $G_2$ because it is necessary for the center portion of the armature assemblies 9 and 17 to have substantial stiffness. However, the circular spaces G and $G_2$ could also be formed by removing material from the radially outer portion of the side of the armature 16 or 25 that faces the armature support member 12 or 21. It is generally not desirable to modify the shape of the armature 16 or 25 because such a modification could adversely change the magnetic characteristics.

The circular spaces G and $G_2$ provide an air gap between the armature 16 or 25 and the radially outer portion of the armature support member 12 or 21. This air gap provided by the circular spaces G and $G_2$ reduces the rate of heat transfer from the armature 16 or 25 to the rubber dampers 15 or 23 and provides space for cooling air movement. Reducing heat transfer to the rubber dampers 15 or 23 and prolongs armature assembly 9 or 17 life.

The preferred embodiments of the invention have been described in detail but are examples only and the invention is not restricted thereto. It will be easily understood by those skilled in the art that modifications and variations can easily be made within the scope of the invention.

What is claimed is:

1. An armature assembly for an electromagnetic coupling device comprising an armature hub, with a boss and a flange, that is adapted to be connected to and rotate with an input shaft;

an armature support member made from a composite material, attached to the armature hub and extending radially outward from the armature hub and having rubber damper holders on its radially outer portion;

a rubber damper mounted in each rubber damper holder;

a coupling post attached to each rubber damper;

an armature, with a radially inner edge, a radially outer edge and a rotor contact surface, attached to each coupling post;

an armature stop surface on the armature hub flange radially positioned between the radially inner edge of the armature and each of the coupling posts, which contacts the armature and limits axial movement of the armature relative to the hub and toward the rubber dampers; and a generally annular space extending axially from the armature to the armature support member and radially outward from the armature stop surface on the armature hub flange to at least the radially outer edge of the armature when the armature is in contact with the armature stop surface and wherein the generally annular space provides sufficient clearance to accommodate normal deformation of the armature support member without holding the armature out of contact with the armature stop surface.

2. An armature assembly for an electromagnetic coupling device as set forth in claim 1 wherein the coupling post attached to each rubber damper extends from the rubber damper, through a passage through the armature support member and to the armature.

3. An armature assembly for an electromagnetic coupling device as set forth in claim 1 wherein the rubber dampers bias the armature toward the armature stop surface.

4. An armature assembly for an electromagnetic coupling device as set forth in claim 1 wherein the armature support member has an integral cylindrical flange that extends axially toward the armature and that is radially spaced outward from the radially outer edge of the armature.

5. An armature assembly for an electromagnetic coupling device as set forth in claim 1 wherein the armature stop surface on the armature hub flange is in a plane transverse to an axis of rotation of the armature hub.

6. An armature assembly for an electromagnetic coupling device comprising an armature hub with a boss and a flange that is adapted to be connected to and rotate with an input shaft;

an armature support member attached to the armature hub extending radially outward from the armature hub and having rubber damper holders on its radially outer portion;

a rubber damper mounted in each rubber damper holder;

a coupling post attached to each rubber damper;

an armature with a radially inner edge, a radially outer edge and a rotor contact surface, attached to each coupling post;

an armature stop surface on the armature support member radially positioned between the radially inner edge of the armature and each of the coupling posts, which contacts the armature and limits axial movement of the armature relative to the hub and toward the rubber dampers; and a generally annular space extending axially from the armature to the armature support member and radially outward from the armature stop surface on the armature support member to at least the radially outer edge of the armature when the armature is in contact with the armature stop surface, said coupling posts extending axially across the generally annular space and is in direct communication with the generally annular space, and wherein the generally annular space provides sufficient clearance to accommodate normal deformation of the armature support member without holding the armature out of contact with the armature stop surface.

7. The armature assembly for an electromagnetic coupling device as set forth in claim 6 wherein the armature support member is made from a composite material.

8. The armature assembly for an electromagnetic coupling device as set forth in claim 7 wherein the armature hub flange is substantially encased in the composite material of the armature support member.

9. The armature assembly for an electromagnetic coupling device as set forth in claim 7 wherein the armature support member is in a plane transverse to an axis of rotation of the armature hub.

10. The armature assembly for an electromagnetic coupling device as set forth in claim 7 wherein a radial outer diameter of the flange of the armature hub is smaller than the diameter of the radially inner edge of the armature.

11. An armature assembly for an electromagnetic coupling device as set forth in claim 7 wherein the coupling post attached to each rubber damper extends from the rubber damper through passage through the armature support member and to the armature.

12. An armature assembly for an electromagnetic coupling device as set forth in claim 7 wherein the rubber dampers bias the armature toward the armature stop surface.

13. An armature assembly for an electromagnetic coupling device as set forth in claim 7 wherein armature support member has an integral cylindrical flange that extends axially toward the armature and that is radially spaced from the radially outer edge of the armature.

* * * * *